United States Patent
Degrass

(10) Patent No.: US 12,321,224 B2
(45) Date of Patent: Jun. 3, 2025

(54) TECHNIQUES FOR IDENTIFYING AND REMEDIATING OPERATIONAL VULNERABILITIES

(71) Applicant: BUGZERO INC., Denver, CO (US)

(72) Inventor: Eric Degrass, Denver, CO (US)

(73) Assignee: BUGZERO INC., Denver, CO (US)

( * ) Notice: Subject to any disclaimer, the term of this patent is extended or adjusted under 35 U.S.C. 154(b) by 0 days.

(21) Appl. No.: 17/430,968

(22) PCT Filed: Feb. 14, 2020

(86) PCT No.: PCT/US2020/018295
§ 371 (c)(1),
(2) Date: Aug. 13, 2021

(87) PCT Pub. No.: WO2020/168194
PCT Pub. Date: Aug. 20, 2020

(65) Prior Publication Data
US 2022/0138041 A1    May 5, 2022

Related U.S. Application Data

(60) Provisional application No. 62/806,113, filed on Feb. 15, 2019.

(51) Int. Cl.
*G06F 11/07* (2006.01)
(52) U.S. Cl.
CPC ...... *G06F 11/0793* (2013.01); *G06F 11/0709* (2013.01)
(58) Field of Classification Search
CPC .... G06F 11/07; G06F 11/0709; G06F 11/079; G06F 11/0793
See application file for complete search history.

(56) References Cited

U.S. PATENT DOCUMENTS

| | | | |
|---|---|---|---|
| 6,944,800 B2 * | 9/2005 | Brundridge | G06F 11/0775 714/48 |
| 7,373,553 B2 * | 5/2008 | Tripp | G06F 11/0748 714/E11.026 |

(Continued)

FOREIGN PATENT DOCUMENTS

WO    2016/190883 A1    12/2016

OTHER PUBLICATIONS

International Application No. PCT/US2020/018295, International Search Report and Written Opinion dated May 19, 2020, 10 pages.

*Primary Examiner* — Sarai E Butler
(74) *Attorney, Agent, or Firm* — Faegre Drinker Biddle & Reath LLP

(57) ABSTRACT

Utilities for addressing operational vulnerabilities in devices of a private IT environment are described to improve uptime and overall operational maturity. Operational vulnerability announcements from various hardware and software vendors are structured and correlated with configuration items to determine whether a device in a private network is subject to an operational vulnerability announcement. When a correlation is determined, one or more remediation actions may be performed, such as generating a problem record, generating an incident record, generating a knowledgebase article, generating an event, generating a task, generating an alert, generating a work item, upgrading or downgrading software of an affected device, and/or applying a workaround, among other examples. A machine learning engine may be used to identify optimized solutions and provide probabilities of an outage occurring with and/or without a recommended solution.

20 Claims, 7 Drawing Sheets

(56) References Cited

U.S. PATENT DOCUMENTS

| | | | |
|---|---|---|---|
| 9,280,409 B2* | 3/2016 | Krampen | G06F 11/2257 |
| 9,459,942 B2* | 10/2016 | Dagan | H04L 43/0817 |
| 10,372,438 B2* | 8/2019 | Kumar | G06F 8/71 |
| 2008/0082857 A1* | 4/2008 | Meijer | G06F 11/004 |
| | | | 714/3 |
| 2018/0351987 A1 | 12/2018 | Patel et al. | |

* cited by examiner

TECHNIQUES FOR IDENTIFYING AND REMEDIATING OPERATIONAL VULNERABILITIES

CROSS-REFERENCE TO RELATED APPLICATION

This application is a U.S. 371 Application of International Patent Application No. PCT/US2020/018295, filed on 14 Feb. 2020, which application claims the benefit of U.S. Patent Application Ser. No. 62/806,113, titled "System and Method for Identifying and Remediating Stability Vulnerabilities", filed on Feb. 15, 2019, the disclosures of which are hereby incorporated by reference in their entireties.

BACKGROUND

Operational vulnerabilities (e.g., "bugs," "defects," "flaws," "faults," "functional vulnerabilities," "errors," "glitches," "stability vulnerabilities," or any other non-security related error in software) caused by errors or unforeseen events means functionality of hardware and/or software of a device may be diminished or cease functioning. For example, an operational vulnerability may cause a device to experience an outage (e.g., device inoperable, at least temporarily), a partial outage (e.g., device operational with reduced functionality or performance), or another type of incident (e.g., one or more specific functions of the device not working properly). Sometimes these operational vulnerabilities can be catastrophic and render a device inoperable and irreparable. For the purposes of this application, all of the effects of an operational vulnerability may be referred to as an "outage" including reduced performance (e.g., degradation in processing or access speed). An outage typically means a customer experiences an interruption in normal operations, which may lead to a loss in productivity or ability to service clients and/or end users, among other potential detriments.

Notably, there is a clear distinction between security vulnerabilities and malware (which result in susceptibility to an attack, leak, or other external exposure) and operational vulnerabilities (which may cause the device to not function properly as a result of programming oversight or some other internal factor or interoperability issues among devices from the same or different vendors, among other examples). In the context of security vulnerabilities, there are established processes, frameworks, etc. for addressing known problems. However, with respect to operational vulnerabilities, there is a need for a more standardized approach and/or framework for ensuring customers (e.g., institutions or businesses that own and operate a device supplied by a vendor, etc.) are made aware of problems and provided with potential solutions. Currently, customers typically are unaware of an operational vulnerability unless and until an outage occurs, a vendor Support Account Manager tells them, or if they manually go looking for the information themselves.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present disclosure is directed to utilities (systems, apparatuses, and methods) for identifying potential operational vulnerabilities associated with devices and performing an appropriate remediation action. Operational vulnerability announcements from various hardware and software vendors are structured and correlated with configuration items to determine whether a device in a private network is subject to an operational vulnerability announcement. When a correlation is determined, one or more remediation actions may be performed, such as generating a problem record, generating an incident record, generating a knowledgebase article, generating an event, generating a task, generating an alert, generating a work item, upgrading or downgrading software of an affected device, and/or applying a workaround, among other examples. A machine learning engine may be used to identify optimized solutions and provide probabilities of an outage occurring with and/or without a recommended solution.

This overview is provided to introduce a selection of concepts in a simplified form that are further described below in the Detailed Description. As such, it is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
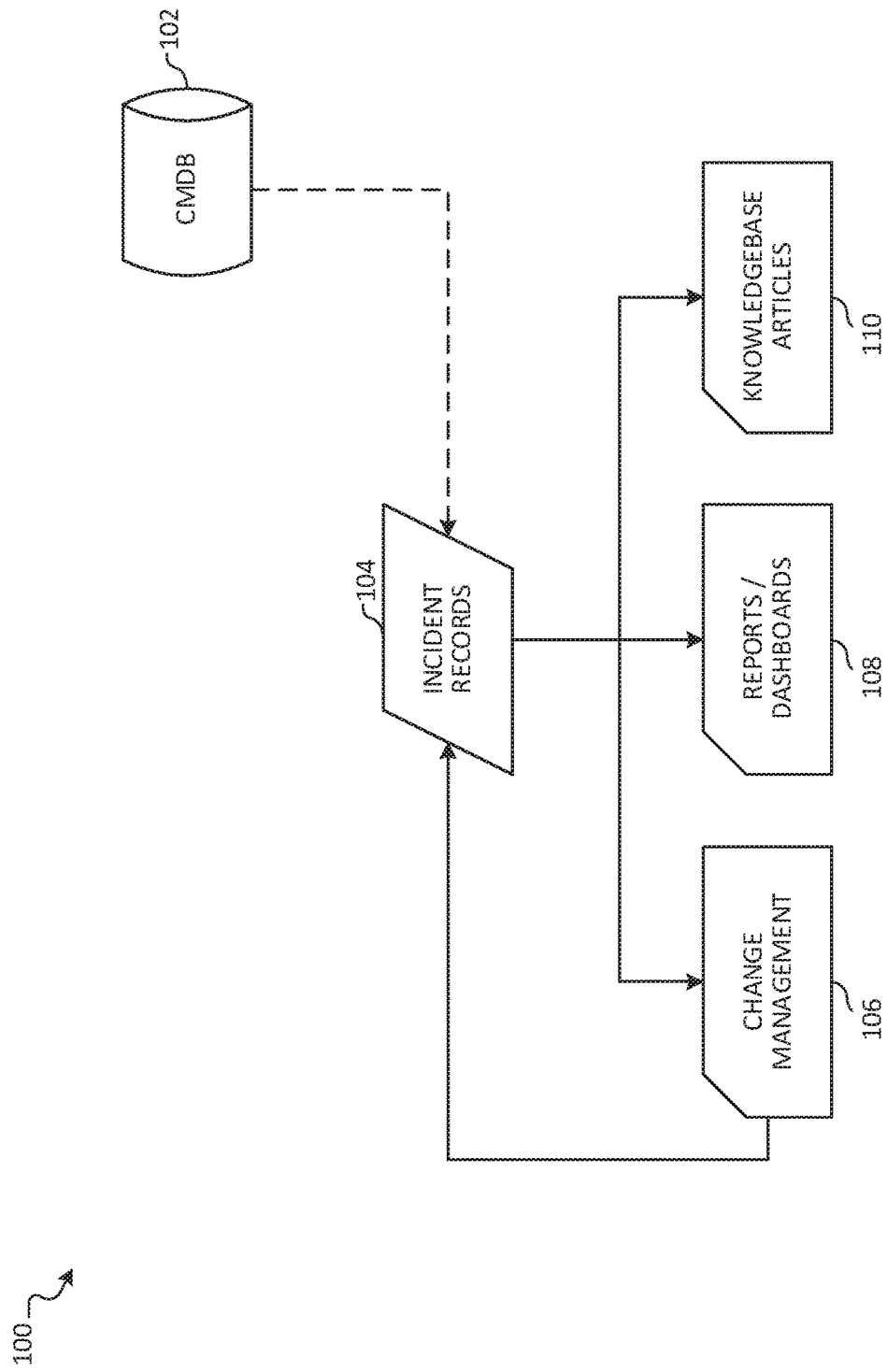
FIG. 1 is a schematic diagram of an architecture associated with an Information Technology Service Management (ITSM) platform.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Today, each information technology (IT) hardware and software vendor issues notifications of operational vulnerabilities ("vulnerability announcements") in any manner they choose. For example, some vendors require customers to log-in to a portal and search for a specific device by model/version numbers or serial number, some vendors may post their vulnerability announcements to a page on their web site, and other vendors may send emails to registered owners which is ineffective for customers with unregistered devices. In the absence of a "normal" or standard process, methodology, or framework to access hardware/software vendor data, each customer is left on its own to mitigate the risk from operational vulnerabilities. As used herein, a "customer" may be an individual, institution, business, or other entity that owns, operates, and/or otherwise manages a device supplied by a vendor. Because customers commonly own a wide variety of devices from a wide variety of vendors, monitoring vulnerability announcements would require continuously checking each vendor's chosen publication site and searching or scanning for each device deployed by the customer. Practically speaking, the effort required to continuously monitor for announcements and determine if they are applicable to the customer is cumbersome. Rather than attempting to stay up-to-date with new vulnerability announcements and proactively take one or more corrective actions (e.g., software update, software rollback, configuration changes, hardware replacement, etc.) before an operational vulnerability causes an adverse impact to operations, the majority of customers simply wait until an outage occurs and then reactively seek out a related vulnerability announcement while troubleshooting. Clearly, with this common approach, outages are not prevented but rather they are addressed if and when they occur.

In an aspect of the present invention, an Information Technology (IT) management tool may collect operational vulnerability information (e.g., in the form of operational vulnerability announcements) and related information from IT hardware and software vendors and store that information in a central repository (for example, a data warehouse or a data lake, among other databases). Example IT management tools include, but are not limited to, monitoring software, an IT service management platform, IT operations management platform, security operations (SecOps) software, IT asset management software, custom-developed IT management software, and event management software. As used herein, a "device" may refer to any item of hardware and/or associated software in a computing environment (e.g., a corporate or an enterprise network, a data center, etc.) including, but not limited to, a server, a personal computer (PC), a router, a memory device, a storage device, a mobile phone, a tablet, a wireless access point, a hub, a switch, a modem, a bridge, a gateway, a repeater, a cloud service (e.g., Software as a Service (SaaS) or Infrastructure as a Service (IaaS), etc.), an application, a software library, firmware, a driver, or any other device or software/solution that may be susceptible to reduced functionality due to operational vulnerabilities. Operational vulnerability information may include, but is not limited to, a unique identifier associated with the operational vulnerability, a classification of severity, a description of the issue, one or more hardware/software versions that are impacted, one or more impacted products, a set of conditions that may trigger the operational vulnerability, one or more known workarounds or solutions, and/or a number of support cases opened against the operational vulnerability. Example vendors include, but are not limited to, Cisco, Dell/EMC, Microsoft, SAP, NetApp, Amazon Web Services, Red Hat, and VMware.

Related information may include the probability or risk score of an outage associated with a particular operational vulnerability or a number of support cases opened by customers in relation to the operational vulnerability, among other information. Workaround information may also be populated in the IT management tool with available temporary fixes in the form of knowledgebase articles. A hyperlink to associated additional information may also be provided. A data normalization and data parsing process may feed a machine learning engine that may provide impact analyses and probabilities to associated with similar environments running the same hardware & software version for which the operational vulnerability information (and other related information) is associated. The machine learning engine may receive feedback in the form of outage and solution information from customers that have deployed solutions in order to identify additional solutions and/or adapt or otherwise optimize existing solutions based on the effectiveness of prior solutions.

The result of processing by the machine learning engine may be a structured operational vulnerability database that comprises structured operational vulnerability information as compared to the unstructured operational vulnerability information stored in the central repository. It will be appreciated that, while examples are described herein with respect to a "central repository" and a "operational vulnerability database," such aspects need not be centralized and may be distributed according to any of a variety of techniques (e.g., in a cloud computing environment, between a customer and the IT management tool, entirely at a customer's premises, etc.). A configuration management database (CMDB) or one or more entries therein may be associated with a particular customer and may be used to correlate configuration item (CI) records and create problem/incident records within the IT management tool for CIs that correlate to a known operational vulnerability (e.g., model number of CI is the same as a model number of a vulnerability announcement).

As used herein, a CI record comprises properties of a customer device, including, but not limited to, a manufacturer, a model and/or serial number, current and/or previous software versions, and/or an IP address. A problem record may comprise information relating to an operational vulnerability, including, but not limited to, a description of the operational vulnerability, the probability of the operational vulnerability occurring on a given device, a risk score, suggested workarounds, suggested changes or software versions that resolve the vulnerability, attempted but unsuccessful workarounds and configuration changes, the number of reported incidents, and/or suspected causes. It will be appreciated that while aspects are described herein with respect to CI records and associated devices, a CMDB and CIs therein need not be used to determine or otherwise identify customer devices in order to correlate operational vulnerabilities with customer devices accordingly.

The IT management tool may generate a risk score for an operational vulnerability based on a set of factors. Example factors include, but are not limited to, a severity classification and/or risk score provided by a vendor, the number of support cases opened against the operational vulnerability, the number of affected devices in the customer's environment, a ratio of the number of support cases to the number of affected devices, and/or the number of new cases within a predetermined time period (e.g., last 24 hours, last day, last week, etc.). Thus, in examples, operational vulnerability information provided by a vendor may be periodically polled (or, as another example, updates may be received from a vendor) in order to identify trends and/or spikes associated with an operational vulnerability. In some instances, the generated risk score is further adapted for a specific customer according to one or more policies and/or data manipulation rules. For example, a priority of a business service (or, in other examples, a technical service, an application service, etc.) associated with the operational vulnerability may be used to either increase or decrease the risk score according to the potential impact to the customer's business. As another example, if the customer has two servers, and one server has already been impacted by the operational vulnerability, the risk score may be increased for the remaining server. In some instances, one or more customers may vote or otherwise provide input on a risk score provided by a vendor, such that the vendor risk score if adapted according to the received customer input.

Reports and dashboards may be used to show pertinent information to the customer so that IT personnel can mitigate the risk of operational vulnerabilities associated with devices in their environment. Reported information may be shown to any or all vendors, an IT management tool operator, customers, and service providers and may include, inter alia, comparisons of stability of comparable devices, known operational vulnerabilities of current devices or software versions as well as known operational vulnerabilities of upgrade or alternative software versions, security vulnerabilities known to exist in current or alternative software versions and how they relate to stability, and total number of pending, resolved, unresolved, etc. support cases related to a particular device model or type of device.

Once a problem record or incident record is reviewed by a subject matter expert (e.g., in a customer's organization, associated with the IT management tool, etc.), they may create or edit a knowledgebase article outlining possible solutions and/or workaround(s) available. In some arrangements of the present disclosure, a knowledgebase article may be generated automatically (e.g., by a processing engine) based on a vulnerability announcement from a vendor (e.g., as may be stored in a central repository). The subject matter expert may then edit the article as appropriate to include attempted solutions and/or workarounds. Additionally, the receipt of a problem record may, at least in part, initiate change management processes including, for example, a software update or configuration change to address the problem.

In the context of this disclosure, "operational vulnerability" may also refer to an interoperability vulnerability. That is, it is relatively common for a specific device to function properly when operating individually or when connected to another device, but the specific device may function improperly when connected to a different device. As an example, many customers have a storage attached network (SAN) device that connects to their servers. However, a Brand A SAN may work properly with a Brand B server, but when connected with a Brand C server the computing environment may experience an outage due to incompatibility. This is just one example and interoperability vulnerabilities can impact the full ecosystem of an IT environment including but not limited to firewall equipment connected to network servers or operating systems and underlying hardware (e.g., Windows Server running on a Hewlett Packard Enterprise (HPE) or Dell server, etc.). For practically every connection point in a network, there are possible interoperability vulnerabilities, even down to the device component level like host bus adapters having interoperability issues with storage systems, or application layer issues with operating systems. It is contemplated that the invention of the present disclosure would include handling of these and any other interoperability vulnerabilities. Thus, in addition to reported information relating to a single device, it will be appreciated that such information may be provided for a set of devices, thereby enabling a customer to evaluate interoperability vulnerabilities for the specific set of devices within the computing environment. In such examples, operational vulnerability information relating to the same operational vulnerability may be accessed from multiple vendors and aggregated according to aspects described herein.

Additionally, while aspects are described herein with respect to one or more pre-existing devices (e.g., that already exist within a computing environment of a customer), it will be appreciated that such aspects may also be performed in view of one or more prospective changes to a computing environment (e.g., adding a new device, removing an existing device, updating or replacing an existing device, etc.). As such, not only is a customer able to evaluate existing operational vulnerabilities, but the customer also has the ability to evaluate operational vulnerabilities associated with such prospective changes to the computing environment. Thus, a simulated computing environment may be generated according to the prospective changes and may then be evaluated accordingly. For example, a predicted risk score may be generated according to operational vulnerabilities associated with the simulated computing environment.

Advantageously, the present disclosure allows a customer to proactively implement workarounds or a process to avoid an outage based upon information related to operational vulnerability information provided by vendors and/or outages experienced by others with similar equipment, among other information. This is in contrast to prior systems in which responses are reactive to an outage actually occurring. Moreover, many vendors currently avoid publicly announcing some operational vulnerabilities due to the reputational harm it may cause. A customer therefore may only become aware of an operational vulnerability after they have experienced an outage and contacted the vendor because they vendor only wants to notify affected customers that the vulnerability exists. In accordance with the present disclosure, a vendor may submit an operational vulnerability announcement into the system and affected parties will be automatically notified as a function of the announcement correlating to a CI. This provides the benefit that vendors may easily provide notice to affected customers without publishing their mistake in a public forum. It should be appreciated that with this context in mind, the term "announcement" as used herein may refer to a semi-confidential notice sent to select customers and need not be publicly available. Moreover, an "announcement" may be provided in any useful format such as one or more data strings fed into an unstructured database.

In an aspect of the present disclosure, a method for remediating operational vulnerabilities in a computing environment is provided. The method may include identifying a plurality of devices in communication within a network (e.g., an enterprise network, a cloud environment, etc.). Known methods for identifying devices include utilizing a server to send discovery requests to a device of the private network (see, e.g., U.S. Pat. App. No. 2018/0324197). Next, the method may include generating a configuration item (CI) for each identified device. Each CI may include properties of the device including, inter alia, manufacturer, model and/or serial number, current and/or previous software versions, IP address, etc. Each CI may be stored in a CMDB. It should be appreciated that there may be a plurality of separate and/or private networks, one or more for each customer associated with a service provider implementing the described method. In one arrangement, a separate CMDB may be maintained for each customer, the CIs within a particular CMDB corresponding to devices on the private network of that respective customer.

In an embodiment, the method may include receiving operational vulnerability announcements from a plurality of vendors. The vendors may be any IT hardware and/or software supplier, including, but not limited to, cloud solution providers, software companies, and original equipment manufacturers (OEMs). Preferably, the plurality of vendors includes every vendor associated with a device in the computing environment (e.g., a hardware manufacturer, a software supplier, etc.). The operational vulnerability announcements may be received in any suitable manner. For example, a web scraper may retrieve the vulnerability announcements in their native format as traditionally supplied by vendors (e.g., retrieved from the vendor's support webpage, as a knowledgebase article, etc.). Alternatively, an application programming interface (API) may be utilized to access a vendor's vulnerability database. As another example, a vendor may provide operational vulnerability announcements using email, such that an email inbox may be scraped to collect operational vulnerability information. In some instances, an agent may be installed on a device, such that the agent gathers information about available software updates (e.g., a changelog indicating one or more bug fixes or performance improvements, etc.) and apparent operational vulnerabilities (e.g., as may be indicated by one or more log files, crash dumps, etc.). Other techniques for obtaining operational vulnerability announcements include, but are not limited to, processing one or more logs on a device impacted by the operational vulnerability to identify information therein and/or processing release notes relating to the operational vulnerability from one or more vendors.

In some instances, some of the plurality of vendors may provide information in one manner and others may provide information in another manner. In this regard, the method may include storing the operational vulnerability announcements in an unstructured operational vulnerability database. That is, the vulnerability announcements may be stored in their raw format as received from each vendor. A processor may be used to implement structuring rules to parse the operational vulnerability announcements to format and/or otherwise adapt the operational vulnerability announcements into a standard form (as may be referred to herein as "structured" vulnerability announcements or "normalized" vulnerability announcements). Once homogenized, the structured operational vulnerability announcements (or data items derived therefrom) may be stored in a structured operational vulnerability database.

A correlation engine may be used to correlate operational vulnerability announcements with one or more devices associated with a customer (e.g., based on one or more CIs in a CMDB, based on a set of devices provided by a customer, etc.). In this regard, a processor implementing the correlation engine may compare entries or objects in the structured operational vulnerability database (which correspond to received vulnerability announcements) with customer devices (e.g., as may be indicated by the CIs in the CMDB). Practically speaking, this step determines whether a device operating in the computing environment of a specific customer is subject to an issue identified in a vulnerability announcement so that appropriate action may be taken by the customer (or service provider).

When a correlation is identified, the method may include applying one or more policies and/or rules to determine an appropriate course of action. For example, the policies and/or rules may be defined by the customer or may otherwise be customer-specific. An example policy may comprise one or more thresholds or ranges corresponding to severities and/or probabilities of outages associated with the pertinent operational vulnerability. A customer may also assign a criticality value to devices within an associated computing environment. For example, operational vulnerabilities associated with highly critical devices may always result in performing a remediation action even if the risk potential is low. On the other end of the spectrum, an operational vulnerability associated with a device that is assigned a low criticality value by the customer may only result in performing a remediation action (or implementation of change) if the vulnerability has a high risk potential, such that if the vulnerability has a lower risk potential, a log entry may be generated or no action may be taken, among other examples.

If determined to be appropriate based upon the customer policies, one or more remediation actions are performed. Example remediation actions include, but are not limited to generating a problem record, generating an incident record, generating a knowledgebase article, generating an event, generating a task, generating an alert, generating a work item, upgrading or downgrading software of an affected device (e.g., automatically, providing an indication to a user to do so, etc.), and/or applying a workaround. For example, a problem record or incident record may include a description of the operational vulnerability, the probability of it occurring on a given device, risk score, suggested workarounds, suggested changes or software versions that resolve the vulnerability, attempted but unsuccessful workarounds and configuration changes, the number of reported incidents, suspected causes, etc. As used herein, a problem record describes an operational vulnerability that affects one or more devices for a customer but is yet to be encountered, while an incident record may have one or more devices that have been affected by the operational vulnerability with which it is associated.

Although such records may also be utilized for reporting to the customer and for formation of knowledgebase articles, the problem record or incident record may be particularly useful for performing change management processes to implement corrective action(s).

In another embodiment, the method may include processing the operational vulnerability data with a machine learning (and/or artificial intelligence) engine prior to said storing structured operational vulnerability announcements in the structured operational vulnerability database. This step may involve referencing, by the machine learning engine, support case data (e.g., supplied by the vendor, service provider, or customers using the IT management tool) associated with active or closed service items. Furthermore, the support case data may include probabilities regarding the likelihood that a given vulnerability will cause an outage for a particular customer given known information about the customer's computing environment. In some instances, the machine learning engine generates a risk score for an operational vulnerability according to aspects described herein. For example, the machine learning engine evaluates a variety of factors associated with the operational vulnerability, customer input, and/or feedback data when generating the risk score. In some instances, the machine learning engine further adapts the risk score for a specific customer, for example according to one or more policies and/or data manipulation rules associated with the customer.

Moreover, the machine learning engine may also access change management reports and other data to analyze attempted solutions (e.g., as may be received from a customer). Because the machine learning engine of the IT management tool may service multiple customers, it may have access to data from a variety of sources. In this regard, a first customer may attempt a change and record a result. That information may be fed to the machine learning engine to formulate a suggested remedy for that customer or another. Accordingly, as customers attempt different solutions, the machine learning engine may observe a variety of approaches as well as probability data and determine those that are more likely to be successful such that recommendations having a high likelihood of success may be provided to customers.

It should be appreciated that steps described in relation to methods and components described in relation to systems may be optional. Numerous additional features and advantages of the present invention will become apparent to those skilled in the art upon consideration of the embodiment descriptions provided hereinbelow.

FIG. 1 illustrates a system architecture 100 that has been used by an ITSM platform. A configuration management database ("CMDB") 102 stores a plurality of configuration items (CIs). Each CI is representative of a particular device in a computing environment of a customer. For example, a CMDB for a data center may include a CI for each server, network switch, or storage device in the data center. A CI may include information such as, but not limited to, the manufacturer, the model, specifications (e.g., storage capacity, processing speed, etc.) the current software version, previous software versions, and more.

When a device represented by a CI stored in CMDB 102 experiences an outage, a record of that occurrence is recorded as an incident. Based on one or more incidents, an incident record 104 may be generated to track information associated with the problem causing the incident(s). In examples, incident record 104 is associated with one or more CIs in CMDB 102, as illustrated by the dashed arrow between CMDB 102 and incident records 104. An example incident record 104 may include information such as equipment details, error logs, priority and category, description of the incident, diagnostic and corrective actions that have been attempted, etc. The incident record 104 may be useful for a variety of purposes. For example, the incident record 104 may be utilized in change management processes 106 to ensure changes are made which address the identified incident. The incident record 104 may also be viewed by the customer through a dashboard or report 108. Additionally, the incident record 104 may be used to generate a knowledgebase article 110 that may be accessed for resolution of future incidents or problems.

Figure 2A:
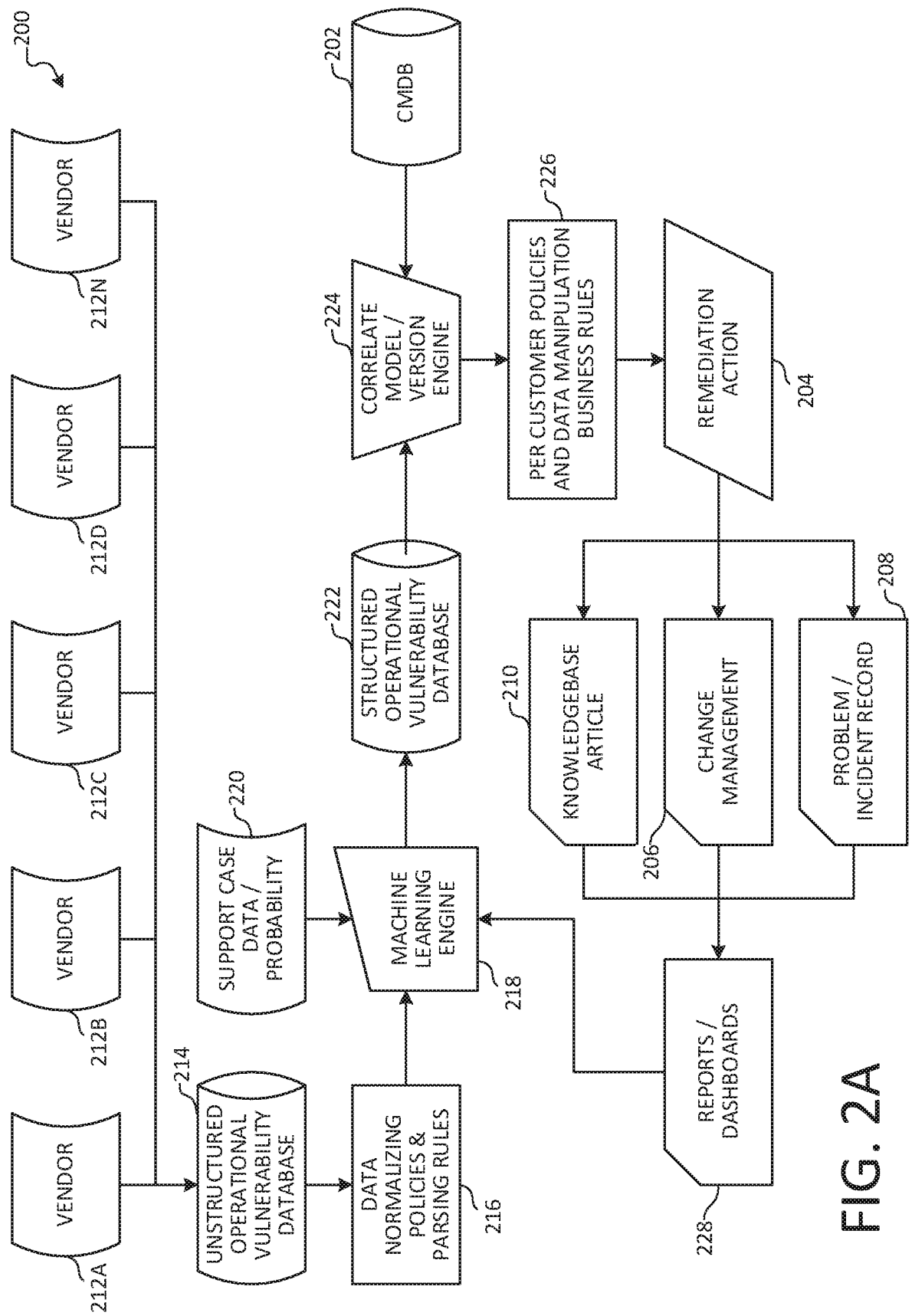
FIG. 2A is a schematic diagram of a system and method for identifying and remediating operational vulnerabilities according to aspects of the current invention.

FIG. 2A includes a system 200 and associated steps related to an improved architecture for problem management according to an embodiment described herein. Vendors 212A-N may include any number of hardware manufacturers, software companies, cloud platforms, retailers, distributors, service providers, and/or the like that supply software and/or hardware used in a computing environment. For example, a computing environment may be an enterprise environment associated with a particular customer of the IT management tool that is implemented by system 200. More specifically, vendors 212A-N may be the suppliers of devices in the computing environment, where each of the devices are represented by CIs in CMDB 202. As noted above, other examples may use any of a variety of other techniques to determine or otherwise identify devices associated with a customer and need not rely on CMDB 202 and CIs stored therein. For example, a set of devices may be provided by a customer or the IT management tool may interface with a different IT management tool (e.g., via an API) to retrieve the set of devices, among other examples.

Vendors may identify operational vulnerabilities associated with their products. For example, internal testing or customer complaints and feedback may lead to a vendor recognizing an operational vulnerability of a particular hardware device, or software operated thereon. In response, the vendor may issue a vulnerability announcement. However, there is no standard manner in which operational vulnerability announcements are published or disseminated, and they often are posted in customer portals or on website pages that are rarely visited, or must be manually remembered and visited. In this regard, it is common for a customer to remain unaware of an operational vulnerability until an incident occurs and IT personnel actively seek out a related operational vulnerability announcement during the troubleshooting process. This current industry practice has led to reactive implementation of corrective action(s). For example, a device in a customer's data center may be subject to an operational vulnerability that is known to the device's vendor, but which is unknown to the customer until the device experiences an outage. It is often at this point that the customer becomes aware of the operational vulnerability by searching the vendor's numerous vulnerability announcements for one or more announcements that are related to the outage or for a support case is opened with the vendor's support organization. Once identified, the problem which is the root of the incident can potentially be addressed through change management but often times the customer has already suffered damage (e.g., loss of data, down-time, loss of productivity, etc.) by this stage in the process.

System 200 in FIG. 2A illustrates a system and method that provides a manner of proactive problem management and potentially change management to address operational vulnerabilities before they cause an incident. In this system 200, an IT management tool may ingest data from vendors 212A-N to retrieve or otherwise access vulnerability announcements and other data associated with previously identified vulnerabilities, which in some instances may include solutions proposed by the respective vendors and/or probability data regarding the likelihood that the vulnerability may cause an outage.

As an example, this information may be accessed by the IT management tool through an API associated with each vendor 212A-N. Additionally or alternatively, one or more of the vendors 212A-N may push or supply vulnerability announcements to the IT management tool, either in real-time or periodically. For example, one of vendors 212A-N may generate emails by which operational vulnerability announcements are provided. Accordingly, such emails may be collected from an email inbox and stored accordingly. In another example, operational vulnerability announcements may be published on a website associated with one of vendors 212A-N, such that the website may be scraped to gather operational vulnerability information. As described above, a software agent may be installed on a device in order to collect operational vulnerability information from the device. A customer may also supply the information if the vulnerability is not publicly announced or released. This may occur when one device is impacted, but other similar (e.g., manufacturer, model, version) devices have not yet been impacted in the environment. It will be appreciated that while example data collection techniques are described herein, any of a variety of other techniques may be used to collect information relating to operational vulnerability announcements from vendors 212A-N.

Given the dissimilarities in the manners in which vendors typically publish vulnerability announcements, there is currently no standard data format or process framework in which operational vulnerability announcements are produced, nor is there an associated workflow to remediate the associated risk. This may lead to difficulty in automated processes provided by system 200. Accordingly, unstructured operational vulnerability database 214 may serve as a repository for storing vulnerability announcements and related data in their native formats (e.g., which may be aggregated from vendors as described above, among other techniques). This information may then be subjected to data normalizing policies and parsing rules 216 (e.g., as may be stored in a rules database, not pictured) by one or more processors to homogenize the information into a standard format. As just one example of standardization of the data, one vendor may classify the most imminent and/or substantial vulnerabilities which are almost certain to cause an outage as "critical," whereas another vendor may classify a similar vulnerability as "severe." The standardization of the data by the policies and rules 216 may result in both operational vulnerabilities being classified as "Level 1" or some other standard designation (assuming Level 1 is highest priority). Thus, a rule may map a vendor-specific field and/or one or more vendor-specific values of an operational vulnerability announcement to a standardized field and/or standardized values that are used when storing the structured operational vulnerability data. In another example, a rule comprises logic that converts an enumerated list to a numeric value, aggregates multiple values of an operational vulnerability announcement into a single field, or performs any of a variety of other operations. In addition, should a vendor change the name of a product, policies and rules 216 may be used to normalize such data between the source (e.g., one of vendors 212A-N) and CI records in the CMDB 202 or any other asset database, among other examples. The normalized data representing a plurality of vulnerabilities from a plurality of vendors may then be stored, in any suitable format (e.g., csv, table, SQL database, etc.), in a structured operational vulnerability database 222.

A correlation engine 224, implemented by one or more processors, may perform a correlation analysis of devices associated with a customer (e.g., as may be indicated by CIs in CMDB 202) as compared to vulnerabilities in structured operational vulnerability database 222. According to aspects described herein, the CMDB 202 stores CIs for devices in one or more computing environments associated with a customer. The correlation engine 224 identifies operational vulnerabilities that are relevant to a customer's devices based on the CIs stored therein. This analysis may initially compare high level descriptors of devices (e.g., manufacturer, device type, etc.) to determine whether a match exists. If a match is identified at this level (e.g., the vulnerability is associated with a Dell server and a CI in CMDB 202 is also associated with a Dell server), the correlation engine 224 may drill down into additional levels (e.g., model, serial number, current software version, etc.) including interoperability and other connected or dependent CIs. In some examples, the correlation engine 224 evaluates specific functionality of a device (e.g., one or more enabled software features, whether specific hardware is present, etc.) to determine whether a vulnerability in the structured vulnerability data relates to the device as-configured. In this regard, the correlation engine 224 utilizes the structured data in structured operational vulnerability database 222 to determine if any devices for a particular customer are susceptible to one of the vulnerabilities identified in the vulnerability announcements from the vendors 212A-N. In another embodiment, the correlation engine 224 may compare each CI to each vulnerability (or vice versa) on a one-to-one basis to determine if there is a match.

In other examples, multiple devices may be evaluated in view of an operational vulnerability, as may be the case for interoperability vulnerabilities. For example, correlation engine 224 may identify a first device and determine a second device associated with the first device (e.g., based on an association with another device indicated by CI records, based on an Ethernet or fiber connection between the devices, etc.). Each of the identified devices may then be analyzed according to the techniques described above (e.g., based on high level descriptors, additional levels, etc.). It will be appreciated that any of a variety of other techniques may be used to identify vulnerabilities in structured operational vulnerability database 222 that are relevant to devices of a customer. It should be further appreciated that an IT management tool may have only a single structured operational vulnerability database 222, whereas there may be a different CMDB 202 for each customer serviced by the IT management tool.

Upon a match (e.g., an inexact match, an exact match, etc.) being determined by the correlation engine 224, a set of policies and rules 226 (at least some of which are likely specific to the particular customer) may be referenced to perform a remediation action 204, such as generating a problem/incident record 208, initiating a change management process 206, and/or generating a knowledgebase article 210. For example, the knowledgebase article 210 may be generated and stored in a known error database. Although a wide variety of policies and rules are contemplated, an example policy would be to disregard operational vulnerabilities with a priority level below a certain threshold. For instance, a customer may only be concerned with "Level 1 or Level 2" vulnerabilities (as classified by the vendor 212, by the data normalizing policies 216, or by the customer's policies and rules 226) and may desire that all others be ignored. Other examples of customer rules or policies 226 may be whether or not an alert is generated and sent to the customer, the frequency at which alerts are sent (e.g., immediately, daily, weekly), which corrective actions are to be automatically deployed (e.g., a minor software patch, restart device, etc.) versus those which require manager approval (e.g., replace device, reformat and/or re-provision device, software upgrade, etc.), among other examples.

A record or article generated as remediation action 204 may be created for a variety of purposes. First, it may be sent to or accessed by the change management processes 206 for implementation of a corrective action. Second, it may be accessible via a portal or dashboard, or published in a report 228 that may be sent to the customer and/or a vendor 212A-N. Additionally, a problem/incident record 208 may be used in the generation of knowledgebase articles 210 that are posted for access by the customer, a vendor 212A-N, and/or the general public to assist in addressing the vulnerability.

Optionally, a machine learning engine 218 may be utilized to optimize proposed corrective actions and/or inform customers as to probability of occurrence of an incident, among other examples. Thus, in addition to normalizing data from the unstructured operational vulnerability database 214 as described above, the data may be further augmented by the machine learning engine 218. For example, support case data and probabilities 220 may include information from one or support cases being handled by a vendor, an IT management tool, or a third-party service provider. A support case may include attempted solutions which have been unsuccessful and/or solutions which have worked, as well as additional incident information such as time stamps, other software running on the device, previous software version numbers, other devices on the network, etc. Additional incident information may include an immense amount of data for each incident. When trying to identify a commonality between multiple incidents associated with the same, but yet-to-be identified problem, machine learning engine 218 may be able to analyze the vast amount of additional incident information much more quickly than technical support personnel. In this regard, effective solutions may be quickly and efficiently identified and deployed.

Machine learning engine 218 is further illustrated as receiving feedback data from the IT management tool (e.g., from reports/dashboards 228, knowledgebase article 210, change management process 206, and/or problem/incident record 208, etc.). For example, an indication that a change was implemented in response to an operational vulnerability may be used to increase a risk score associated with the operational vulnerability. In examples, the feedback data is anonymized. Example feedback data includes, but is not limited to, device information (e.g., a device vendor, a model number, serial number, software version number, etc.), a unique identifier associated with an operational vulnerability responsible for an outage of the device, and/or additional information relating to the operational vulnerability. Accordingly, the feedback data is used by machine learning engine 218 to further augment structured operational vulnerability stored in structured operational vulnerability database 222. Such aspects provide additional information relating to operational vulnerabilities to customers, especially in scenarios where an associated operational vulnerability announcement provided by a vendor is incomplete or does not provide a high level of detail regarding the operational vulnerability (e.g., as may be the case when the operational vulnerability was only recently discovered).

In some instances, machine learning engine 218 generates a risk score for an operational vulnerability that is associated with the operational vulnerability in structured operational vulnerability database 222. For example, machine learning engine 218 evaluates a variety of factors associated with the operational vulnerability (e.g., a severity classification and/or risk score provided by a vendor, the number of support cases opened against the operational vulnerability, the number of affected devices in the customer's environment, a ratio of the number of support cases to the number of affected devices, and/or the number of new cases within a predetermined time period, etc.), customer input (e.g., indicating whether a risk score provided by a vendor should be increased, decreased, or maintained, among other examples), and/or feedback data when generating the risk score. In some instances, machine learning engine 218 further adapts the risk score for a specific customer, for example according to one or more policies and/or data manipulation rules 226 associated with the customer.

Additionally or alternatively, the support case data 220 may include probabilities regarding a likelihood that a particular solution will be effective in a particular circumstance. That is, the machine learning engine 218 may analyze multiple incidents and their additional incident information and determine that in certain circumstances, one solution may be more effective at eliminating the operational vulnerability whereas in another set of circumstances, a different solution may be more effective.

Moreover, vendors 212A-N may supply probability data regarding the likelihood that a particular operational vulnerability will cause an incident. For example, vendor 212C may know that regarding a particular product, they have sold 200,000 devices. If those devices have been in service for a year but only one incident has been reported, vendor 212C may provide an indication that the probability of that operational vulnerability causing an incident are very low. This information may be displayed on reports 228 so the customer is aware. Additionally, the data manipulation business rules 226 may exclude vulnerabilities with probabilities and/or risk scores of less than a desired amount.

Figure 2B:
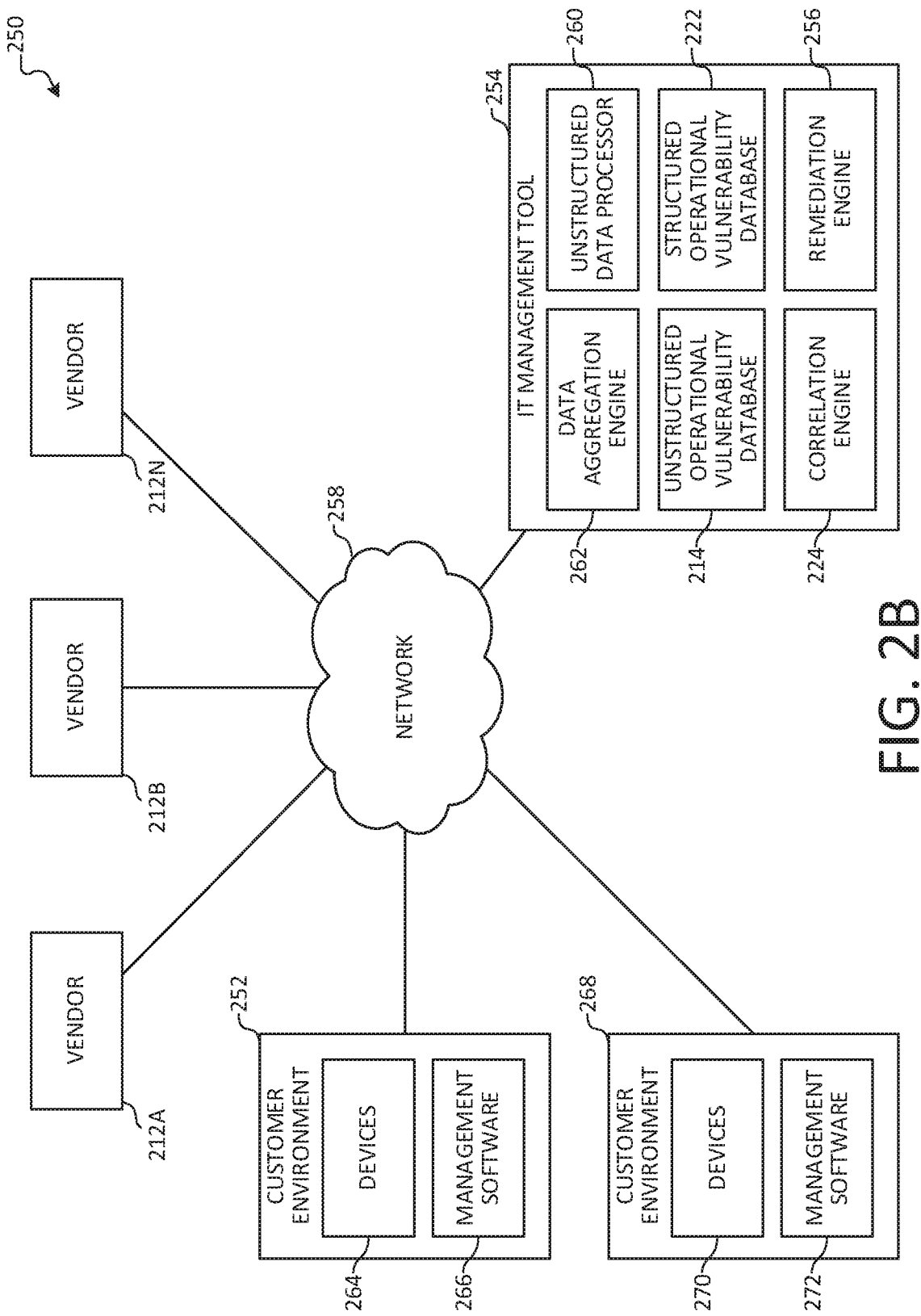
FIG. 2B is an overview of an example system for identifying and remediating operational vulnerabilities according to aspects of the current invention.

FIG. 2B is an overview of an example system 250 for identifying and remediating operational vulnerabilities according to aspects of the current invention. System 250 comprises elements that were described above with respect to FIG. 2A and are therefore not necessarily re-described below in detail. As illustrated, vendors 212A-N, customer environment 252, customer environment 268, and IT management tool 254 communicate via network 258. Network 258 may comprise a local area network, a wide area network, and/or the Internet, among other examples. Customer environment 252 is a computing environment associated with a first customer and may comprise any of a variety of devices 264, including, but not limited to, a gateway, a router, a switch, a firewall device, a server device, a desktop computing device, a laptop computing device, a tablet computing device, and/or a mobile computing device, among other examples. Similarly, customer environment 268 comprises any of a variety of devices 270 associated with a second customer. Management software 266 and 272 may be installed on one or more of devices 264 and 270, respectively, thereby enabling the devices to be remotely managed and/or monitored. In examples, management software 266 and 272 comprises one or more scripts, applications, and/or services, among other software, that collect information, transmit such information (e.g., to IT management tool 254), and/or alter device configuration, among other examples. While system 250 is illustrated as comprising two customer environments 252 and 268, it will be appreciated that, in other examples, any number of computing environments may be used and, in some examples, multiple environments may be associated with the same customer.

IT management tool 254 is illustrated as comprising data aggregation engine 262, unstructured data processor 260, unstructured operational vulnerability database 214, structured operational vulnerability database 222, correlation engine 224, and remediation engine 256. In examples, data aggregation engine 262 aggregates operational vulnerability announcements from vendors 212A-N according to aspects described herein, which are stored in unstructured operational vulnerability database 214. For example, data aggregation engine 262 uses a web scraper to retrieve vulnerability announcements in their native format as traditionally supplied by vendors 212A-N (e.g., retrieved from the vendor's support webpages, as a knowledgebase article, etc.). Alternatively, data aggregation engine 262 uses an API to access a vendor's vulnerability announcement database. As another example, one of vendors 212A-N may provide operational vulnerability announcements via email, such that data aggregation engine 262 scrapes an email inbox to collect operational vulnerability information. In some instances, an agent may be installed on a device (e.g., at least a part of management software 266 and 272), such that the agent gathers information about available software updates and/or apparent operational vulnerabilities of the device.

Unstructured data processor 260 processes the unstructured operational vulnerability information in unstructured operational vulnerability database 214 to generate structured operational vulnerability data, which is stored in structured operational vulnerability database 222. In examples, unstructured data processor 260 performs aspects similar to those discussed above with respect to the data normalizing policies and parsing rules 216 and machine learning engine 218 in system 200 of FIG. 2A. For example, unstructured data processor 260 accesses unstructured operational vulnerability information from unstructured operational vulnerability database 214 and processes the unstructured information according to one or more normalizing policies and/or parsing rules. As another example, unstructured data processor 260 applies one or more machine learning models to the unstructured vulnerability information in order to classify the information accordingly and/or to augment the information based on feedback data (e.g., as may be received from a customer). In some instances, unstructured data processor 260 generates a risk score for an operational vulnerability, where the risk score is generated based at least in part on a severity classification and/or risk score provided by a vendor, the number of support cases opened against the operational vulnerability, the number of affected devices, a ratio of the number of support cases to the number of affected devices, and/or the number of new cases within a predetermined time period (e.g., last 24 hours, last day, last week, etc.), among other factors. The generated risk score may be associated with the operational vulnerability in structured operational vulnerability database 222.

In examples, correlation engine 224 evaluates operational vulnerability data from structured operational vulnerability database 222 to identify operational vulnerabilities that are relevant to devices of the customer (e.g., devices 264 for the first customer or device 270 for devices of the second customer). For example, relevant devices may be determined from CIs that are accessed from a CMDB, such as CMDB 202 in FIG. 2A. As described above, the analysis may compare high level descriptors of devices and/or additional levels of descriptors to identify matching operational vulnerabilities. As another example, correlation engine 224 evaluates specific functionality of a device to determine whether a vulnerability is relevant to a customer. It will be appreciated that any of a variety of other techniques may be used to identify vulnerabilities in structured operational vulnerability database 222 that are relevant to devices of the customer.

Remediation engine 256 performs one or more remediation actions according to aspects described herein. For example, remediation engine 256 generates a problem record and/or incident record according to an operational vulnerability from structured operational vulnerability database 222 that is identified to be relevant to the customer (e.g., as may be determined by correlation engine 224). As described above, a problem record may comprise information relating to an operational vulnerability, including, but not limited to, a description of the operational vulnerability, the probability of the operational vulnerability occurring on a given device, a risk score, suggested workarounds, suggested changes or software versions that resolve the vulnerability, attempted but unsuccessful workarounds and configuration changes, the number of reported incidents, and/or suspected causes. In some instances, remediation engine 256 adapts a risk score (e.g., as may have been generated by unstructured data processor 260) for a specific customer according to one or more policies and/or data manipulation rules.

In some example, remediation engine 256 generates one or more knowledgebase articles (e.g., based on a problem record, an incident record, etc.), which may be posted for access by the customer, a vendor 212A-N, and/or the general public to assist in addressing the operational vulnerability. As another example, a generated record may be sent to or accessed by a change management process for implementation of a corrective action according to aspects described herein. In other examples, a generated record may be accessible via a portal, dashboard, and/or published in a report that may be sent to the customer and/or a vendor 212A-N, among other recipients.

While certain functionality is described with respect to customer environments 252 and 268, and IT management tool 254, it will be appreciated that the functionality described herein may be divided according to any of a variety of other paradigms. For example, each customer may maintain its own CMDB 202. As another example, data aggregation engine 262, unstructured data processor 260, unstructured operational vulnerability database 214, structured operational vulnerability database 222, correlation engine 224, and/or remediation engine 256 need not be centralized at IT management tool 254, but such functionality may instead be provided within a customer environment 252 or 268. In such examples, the customer associated with customer environment 252 or 268 may have individualized or otherwise restricted access to operational vulnerability announcements from vendors 212A-N and may therefore utilize such access to aggregate operational vulnerability announcements (e.g., using data aggregation engine 262) in unstructured operational vulnerability database 214 similar to the aspects described above. Thus, rather than a centralized repository of operational vulnerability information, each customer may instead maintain its own operational vulnerability database. As another example, IT management tool 254 may provide policies and/or rules that are utilized by an unstructured data processor at customer device 252 in order to process the unstructured operational vulnerability information accordingly.

Figure 2C:
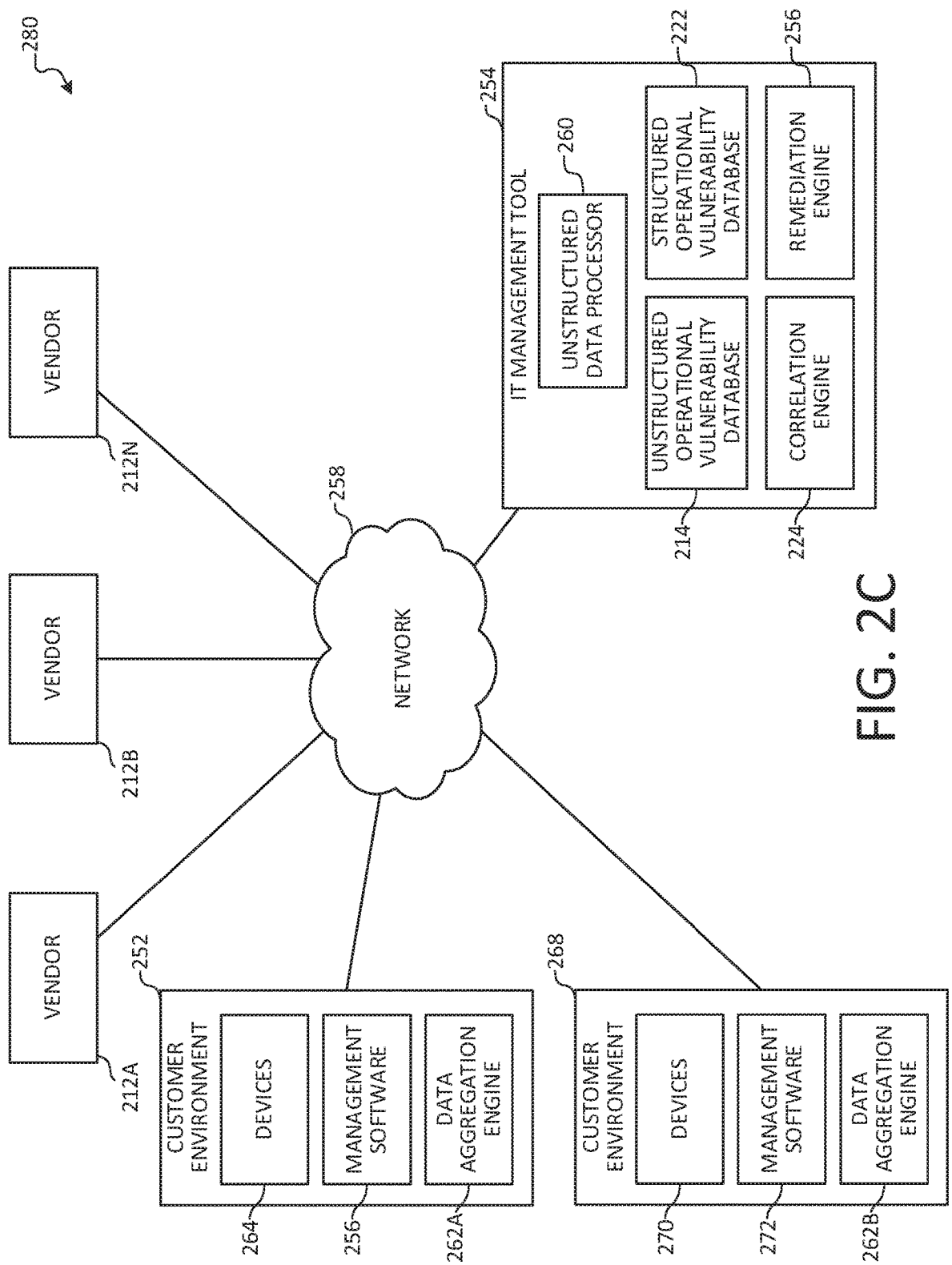
FIG. 2C is an overview of another example system for identifying and remediating operational vulnerabilities according to aspects of the current invention.

FIG. 2C is provided to illustrate an overview of another example system 280 for identifying and remediating operational vulnerabilities according to aspects of the current invention. System 280 comprises elements that were described above with respect to FIGS. 2A and 2B and are therefore not necessarily re-described below in detail. As compared to system 250 of FIG. 2B, system 280 illustrates customer environments 252 and 268 as comprising data aggregation engines 262A and 262B, whereas IT management tool 254 is shown as comprising data aggregation engine 262 in FIG. 2B. Thus, each customer environment may operate a respective data aggregation engine that collects operational vulnerability information according to aspects described herein. Such aspects may be used in instances where operational vulnerability information is not widely available but is available to a customer, such that access provided to the customer by vendors 212A-212N may be used to collect the operational vulnerability information.

As illustrated, data aggregation engines 262A and 262B may provide at least a part of the collected operational vulnerability information to IT management tool 254, where it is processed as described above. In other examples, at least one of elements 214, 222, 224, 256, and/or 260 may also be located in customer environment 252 or 268 (e.g., similar to data aggregation engine 262A or 262B, respectively), thereby enabling at least a part of the processing described with respect to IT management tool 254 to be performed on-premises.

Figure 3A:
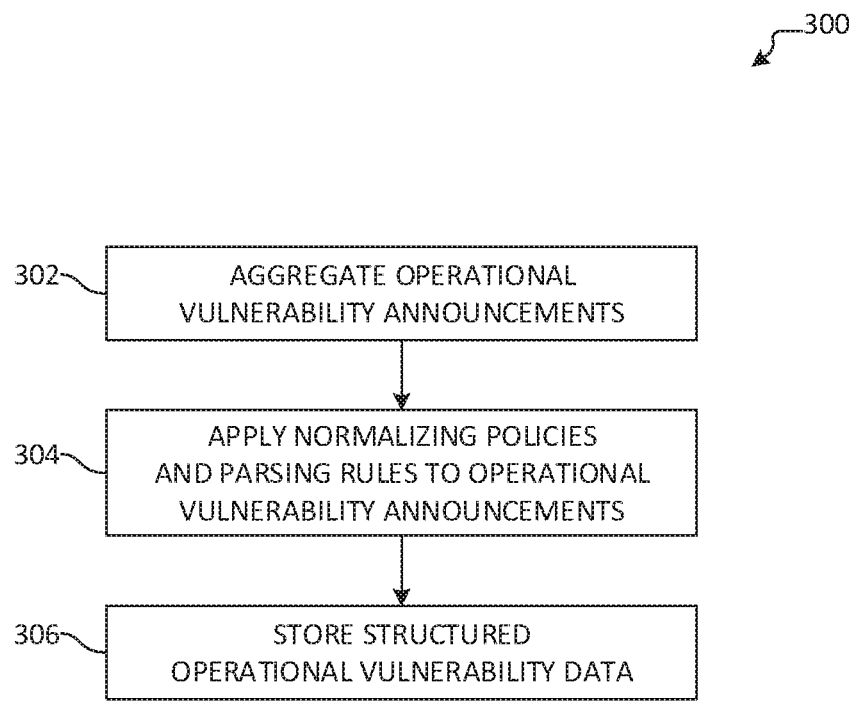
FIG. 3A is an overview of an example method for generating structured operational vulnerability information based on an operational vulnerability announcement from a vendor.

FIG. 3A is an overview of an example method 300 for generating structured operational vulnerability information based on an operational vulnerability announcement from a vendor. In examples, aspects of method 300 are performed by aspects of system 200 or 250 described above with respect to FIGS. 2A and 2B, respectively. For example, an IT management tool such as IT management tool 254 may perform aspects of method 300. As another example, a customer device (e.g., customer device 252 in FIG. 2B) may perform aspects of method 300.

Method 300 begins at operation 302, where operational vulnerability announcements are aggregated. Operational vulnerability announcements may be aggregated from any number of vendors, such as vendors 212A-N in FIGS. 2A and 2B. Vulnerability information may be stored in an unstructured operational vulnerability database. Announcements may be accessed using a vendor's API. Additionally or alternatively, a vendor may push or supply vulnerability announcements, either in real-time or periodically. As an example, an email comprising an operational vulnerability announcements may be received, such that the email may be collected from an email inbox and stored accordingly. In another example, operational vulnerability announcements may be published on a website associated with a vendor, such that the website may be scraped to gather operational vulnerability information. In other examples, a software agent may be installed on a device and used to collect operational vulnerability information from the device. Vulnerability information may also be received from a customer (e.g., as may be the case when a vulnerability is not publicly announced or released). Other techniques for obtaining operational vulnerability announcements include, but are not limited to, processing one or more logs on a device impacted by the operational vulnerability to identify information therein and/or processing release notes relating to the operational vulnerability from one or more vendors. It will be appreciated that while example data collection techniques are described herein, any of a variety of other techniques may be used to collect information relating to operational vulnerability announcements from vendors 212A-N.

Flow progresses to operation 304, where normalizing policies and parsing rules are applied to the operational vulnerability announcements that were aggregated at operation 302. In examples, aspects of operation 302 are performed according to data normalizing policies and parsing rules 216 and machine learning engine 218 in system 200 of FIG. 2A and/or by unstructured data processor 260 in FIG. 2B. As an example, the unstructured vulnerability information aggregated at operation 302 is processed according to one or more normalizing policies and/or parsing rules in order to normalize one or more fields and/or values of the vulnerability information, among other examples. As another example, one or more machine learning models may be applied to the unstructured vulnerability information in order to classify the information accordingly and/or to augment the information based on feedback data as described above.

Operation 304 may further comprise generating a risk score for the operational vulnerability, which may be associated with the operational vulnerability accordingly. As discussed above, the risk score may be generated based at least in part on a severity classification and/or risk score provided by a vendor, the number of support cases opened against the operational vulnerability, the number of affected devices, a ratio of the number of support cases to the number of affected devices, and/or the number of new cases within a predetermined time period (e.g., last 24 hours, last day, last week, etc.), among other factors.

At operation 306, the structured operational vulnerability data is stored for subsequent access by one or more customers. For example, the data may be stored in a structured operational vulnerability database such as structured operational vulnerability database 222 discussed above with respect to FIGS. 2A and 2B. As discussed above, the structured vulnerability data may be stored in any suitable format (e.g., csv, table, database, etc.). Flow terminates at operation 306.

Figure 3B:
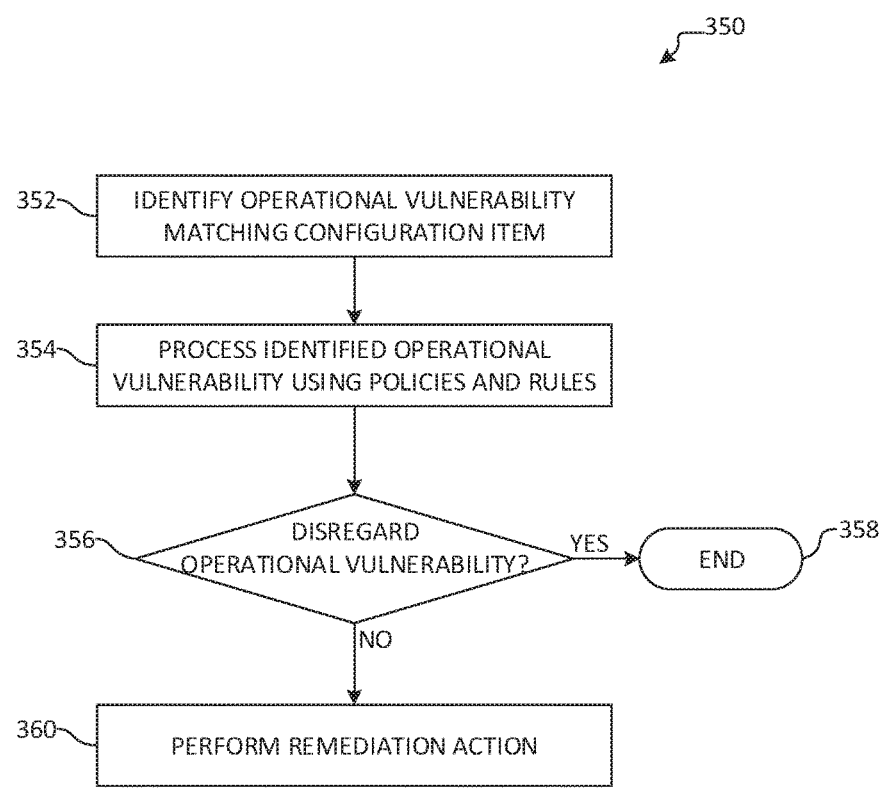
FIG. 3B is an overview of an example method for identifying an operational vulnerability that is relevant to a customer and performing a remediation action accordingly.

FIG. 3B is an overview of an example method 350 for identifying an operational vulnerability that is relevant to a customer and performing a remediation action accordingly. In examples, aspects of method 350 are performed by aspects of system 200 or 250 described above with respect to FIGS. 2A and 2B, respectively. For example, an IT management tool such as IT management tool 254 may perform aspects of method 350. As another example, a customer device (e.g., customer device 252 in FIG. 2B) may perform aspects of method 350.

Method 350 begins at operation 352, where an operational vulnerability matching a CI is identified. In examples, operation 352 comprises accessing a structured operational vulnerability database, such as structured operational vulnerability database 222 in FIGS. 2A and 2B. A match may be identified by evaluating devices associated with a customer, for example as may be indicated by CI records stored by a CMDB, such as CMDB 202. As described above, a CI record comprises properties of a customer device, including, but not limited to, a manufacturer, a model and/or serial number, current and/or previous software versions, and/or an IP address, among other properties. In examples, a CI is evaluated by a correlation engine, such as correlation engine 224, in order to determine whether an operational vulnerability in the structured operational vulnerability database is relevant to a device of a customer.

Flow progresses to operation 354, where the identified operational vulnerability is processed according to one or more policies and/or rules. In examples, a policy or rule may be customer-specific. An example policy or rule may indicate that an operational vulnerability with a priority level below a predetermined threshold should be ignored. Other examples of rules or policies may be whether or not an alert is generated and sent to the customer, the frequency at which alerts are sent, and which corrective actions are to be automatically deployed versus those which require manager approval, among other examples.

In some instances, operation 354 comprises adapting a risk score associated with the operational vulnerability (e.g., as may have been generated by operation 304 of method 300 in FIG. 3A). For example, a priority of a business service associated with the operational vulnerability may be used to either increase or decrease the risk score according to the potential impact to the customer's business.

At determination 356, it is determined whether to disregard the operational vulnerability. In examples, a risk score is compared to a predetermined threshold (e.g., as may be specified by a customer) in order to determine whether a remediation action should be performed. In other examples, one or more devices associated with the operational vulnerability are identified and evaluated to determine whether the customer is interested in problem records for the associated devices (e.g., according to a device type, a vendor, a model number, etc.). Thus, an allow list and/or block list may be used to filter problem records according to device type. It will be appreciated that any of a variety of other determinations may be used. If it is determined that the operational vulnerability should be disregarded, flow branches "YES" to operation 358, where method 350 ends. It will be appreciated that, in other examples, the vulnerability may be logged for periodic review by the customer, among other actions.

However, if it is determined that the operational vulnerability should not be disregarded, flow instead branches "NO" to operation 360, where a remediation action is performed. According to aspects described herein, example remediation actions include generating a problem record, an incident record, and/or a knowledgebase article. In examples, aspects of operation 360 are performed by a remediation engine, such as remediation engine 256 in FIG. 2B. As described above, a problem record or incident record may comprise information relating to an operational vulnerability, including, but not limited to, a description of the operational vulnerability, the probability of the operational vulnerability occurring on a given device, a risk score (e.g., as may have been adapted at operation 354), suggested workarounds, suggested changes or software versions that resolve the vulnerability, attempted but unsuccessful workarounds and configuration changes, the number of reported incidents, and/or suspected causes.

In some examples, operation 360 comprises generating one or more knowledgebase articles based on the problem record, providing the problem record to a change management process for implementation of a corrective action, and/or making the problem record accessible via a portal or dashboard, among other examples. Method 350 terminates at operation 360.

Figure 4:
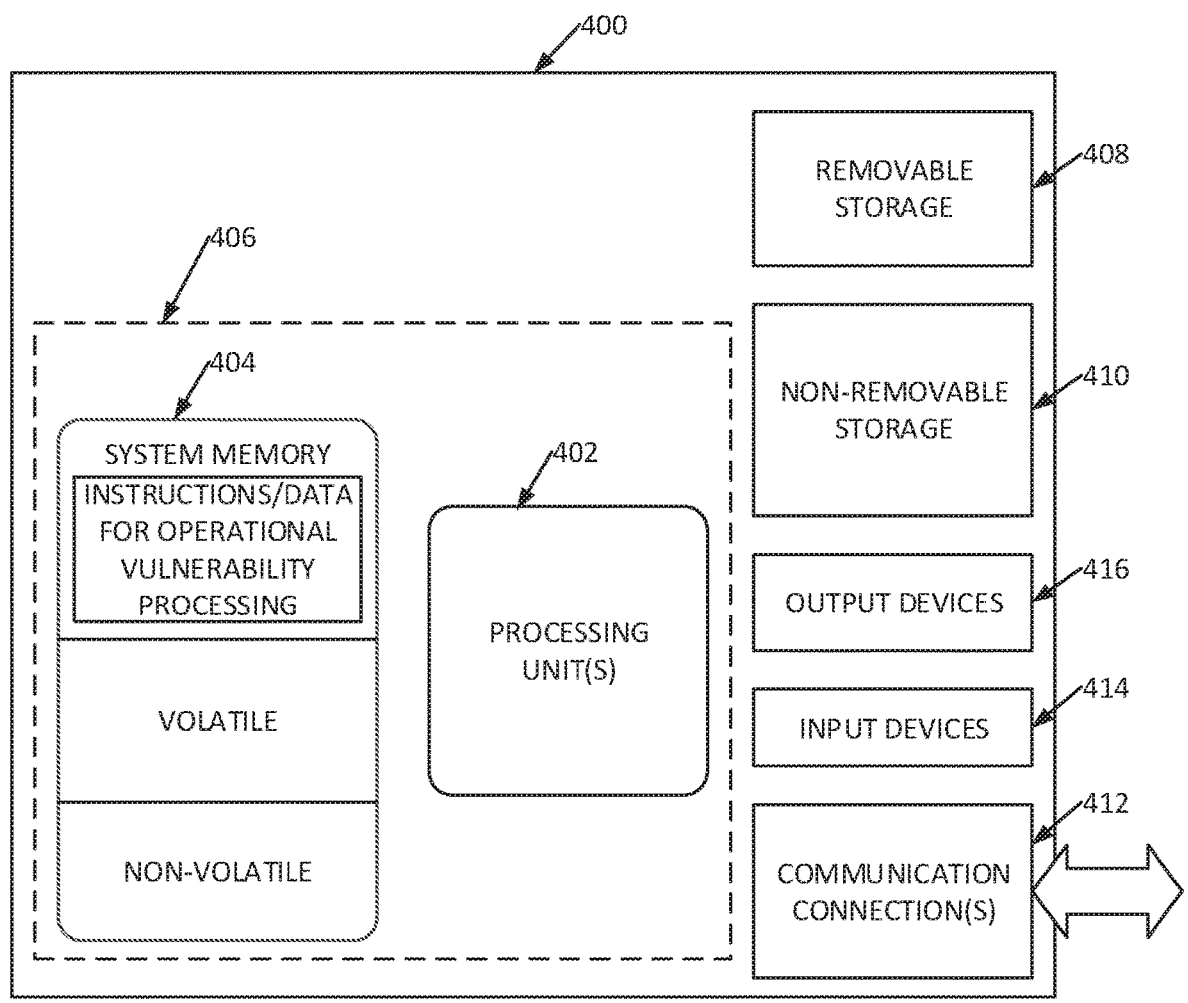
FIG. 4 illustrates an example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, business software such as enterprise resource planning ("ERP", e.g. SAP and Oracle), public cloud platforms like Amazon Web Services and Microsoft Azure, networking equipment, storage systems, hyperconverged infrastructure (Nutanix), virtualization software like VMware, database systems, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, policies, operational vulnerability announcements, normalization rules, problem records, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks, tape, or solid-state disks. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods and systems according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a method for remediating an operational vulnerability in a computing environment of a customer. The method comprises: accessing an operational vulnerability announcement from a vendor; processing the operational vulnerability announcement to generate a structured operational vulnerability announcement; storing the structured operational vulnerability announcement in a structured operational vulnerability database; evaluating a set of devices associated with the computing device of the customer to determine that the structured operational vulnerability announcement relates to a device of the customer;

and based on determining that the structured operational vulnerability announcement relates to the device, performing a remediation action based on the structured operational vulnerability announcement. In an example, evaluating the set of devices associated with the computing environment of the customer comprises: accessing a set of configuration items for the customer from a configuration management database, wherein each configuration item is associated with a device of the set of devices; and comparing each configuration item to the structured operational vulnerability announcement to determine whether the operational vulnerability announcement is applicable to the device represented by the configuration item. In another example, processing the operational vulnerability announcement comprises at least one of: processing said operational vulnerability announcements with a machine learning engine; or applying at least one normalizing policy or parsing rule to the operational vulnerability announcement. In a further example, processing the operational vulnerability announcement further comprises: generating a risk score for the operational vulnerability announcement; and associating the generated risk score with the structured operational vulnerability announcement. In yet another example, the method further comprises evaluating the risk score based on a policy of the customer to determine whether to disregard the operational vulnerability announcement, and the remediation action is performed based at least in part on determining not to disregard the operational vulnerability. In a further still example, performing the remediation action comprises performing at least one remediation action selected from a group of remediation actions consisting of: generating a problem record; generating an incident record; generating a knowledgebase article; generating an event; generating a task; generating an alert; generating a work item; upgrading or downgrading software on the device; and applying a workaround. In an example, accessing the operational vulnerability announcement from the vendor comprises one of: scraping a website of the vendor to access the operational vulnerability announcement; using an application programming interface to access the operational vulnerability announcement; accessing the operational vulnerability announcement from an email inbox; receiving information relating to the operational vulnerability announcement from a software agent; receiving information relating to the operational vulnerability announcement from a log on an impacted device; or receiving information.

In another aspect, the technology relates to a method for remediating operational vulnerabilities. The method comprises: identifying devices in a computing environment of a first customer; generating a configuration item (CI) for each identified device; storing the CIs in a configuration management database (CMDB), wherein each CI is associated with the first customer; generating a structured operational vulnerability announcement for an operational vulnerability based on operational vulnerability information from a vendor; storing the structured operational vulnerability announcement in a structured database; correlating the structured operational vulnerability announcement with the stored CIs to determine that at least one CI of the stored CIs indicates a device affected by the operational vulnerability; based on determining that at least one CI indicates a device affected by the operational vulnerability, performing at least one remediation action selected from a group of remediation actions consisting of: generating a problem record; generating an incident record; generating a knowledgebase article; generating an event; generating a task; generating an alert; generating a work item; upgrading or downgrading software on the device; and applying a workaround. In an example, correlating the structured operational vulnerability announcement with the stored CIs comprises evaluating at least one of a manufacturer, a model, a software version, or a date of production for each CI of the stored CIs. In another example, the at least one remediation action is performed further based on determining not to disregard the operational vulnerability announcement based on a policy of the first customer. In a further example, the method further comprises: correlating the structured operational vulnerability announcement with CIs of a second customer to determine that a device of the second customer is affected by the operational vulnerability; evaluating the structured operational vulnerability announcement based on a policy of the second customer to determine whether to disregard the operational vulnerability announcement; and disregarding the operational vulnerability announcement for the second customer. In yet another example, generating the structured operational vulnerability announcement comprises generating a risk score for the operational vulnerability announcement. In a further still example, the risk score for the operational vulnerability announcement is adapted for the first customer.

In a further aspect, the technology relates to a system comprising at least one processor; and memory operatively connected to the at least one processor and storing instructions that, when executed by the at least one processor, cause the system to perform a set of operations. The set of operations comprises: accessing an operational vulnerability announcement from a vendor; processing the operational vulnerability announcement to generate a structured operational vulnerability announcement; storing the structured operational vulnerability announcement in a structured operational vulnerability database; evaluating a set of devices associated with the computing device of the customer to determine that the structured operational vulnerability announcement relates to a device of the customer; and based on determining that the structured operational vulnerability announcement relates to the device, performing a remediation action based on the structured operational vulnerability announcement. In an example, evaluating the set of devices associated with the computing environment of the customer comprises: accessing a set of configuration items for the customer from a configuration management database, wherein each configuration item is associated with a device of the set of devices; and comparing each configuration item to the structured operational vulnerability announcement to determine whether the operational vulnerability announcement is applicable to the device represented by the configuration item. In another example, processing the operational vulnerability announcement comprises at least one of: processing said operational vulnerability announcements with a machine learning engine; or applying at least one normalizing policy or parsing rule to the operational vulnerability announcement. In a further example, processing the operational vulnerability announcement further comprises: generating a risk score for the operational vulnerability announcement; and associating the generated risk score with the structured operational vulnerability announcement. In yet another example, the set of operations further comprises evaluating the risk score based on a policy of the customer to determine whether to disregard the operational vulnerability announcement, and the remediation action is performed based at least in part on determining not to disregard the operational vulnerability. In a further still example, performing the remediation action comprises performing at least one remediation action selected from a group of remediation actions consisting of: generating a problem record; generating an incident record; generating a knowledgebase article; generating an event; generating a task; generating an alert; generating a work item; upgrading or downgrading software on the device; and applying a workaround. In another example, accessing the operational vulnerability announcement from the vendor comprises one of: scraping a website of the vendor to access the operational vulnerability announcement; using an application programming interface to access the operational vulnerability announcement; accessing the operational vulnerability announcement from an email inbox; receiving information relating to the operational vulnerability announcement from a software agent; receiving information relating to the operational vulnerability announcement from a log on an impacted device; or receiving information relating to the operational vulnerability announcement from a release note from the vendor.

It will be readily appreciated that many deviations may be made from the specific embodiments disclosed in the specification without departing from the spirit and scope of the invention. The illustrations and discussion herein have only been provided to assist the reader in understanding the various aspects of the present disclosure. Furthermore, one or more various combinations of the above discussed arrangements and embodiments are also envisioned.

Embodiments disclosed herein can be implemented as one or more computer program products, i.e., one or more modules of computer program instructions encoded on computer storage media for execution by, or to control the operation of, data processing apparatus (processors, cores, etc.). The computer storage media can be non-transitory, a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

A computer program (also known as a program, software, software application, script, or code) used to provide the functionality described herein can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A method for remediating an operational vulnerability in a computing environment of a customer, comprising:
   accessing an operational vulnerability announcement from a vendor;
   processing the operational vulnerability announcement according to a set of rules to generate a structured operational vulnerability announcement, wherein a rule of the set of rules generates a value for a field of the structured operational vulnerability announcement based on the operational vulnerability announcement from the vendor;
   storing the structured operational vulnerability announcement in a structured operational vulnerability database;
   obtaining, from a configuration management database, a set of configuration items, wherein each configuration item of the set of configuration items corresponds to a computing device in a computing environment of the customer;
   processing, based on the generated value for the field of the structured operational vulnerability announcement, a configuration item of the set of configuration items to determine that the structured operational vulnerability announcement relates to a device for the configuration item; and
   based on determining that the structured operational vulnerability announcement relates to the device, automatically performing a remediation action for the device based on the structured operational vulnerability announcement.

2. The method of claim 1, wherein processing the operational vulnerability announcement comprises at least one of:
   processing said operational vulnerability announcement with a machine learning engine; or
   applying at least one normalizing policy or parsing rule to the operational vulnerability announcement.

3. The method of claim 1, wherein processing the operational vulnerability announcement further comprises:
   generating a risk score for the operational vulnerability announcement; and
   associating the generated risk score with the structured operational vulnerability announcement.

4. The method of claim 3, wherein the method further comprises evaluating the risk score based on a policy of the customer to determine whether to disregard the operational vulnerability announcement, and wherein the remediation action is performed based at least in part on determining not to disregard the operational vulnerability announcement.

5. The method of claim 1, wherein automatically performing the remediation action comprises at least one of:
   generating a problem record;
   generating an incident record;
   generating a knowledgebase article;
   generating an event;
   generating a task;
   generating an alert;
   generating a work item;
   upgrading software on the device;
   downgrading software on the device;
   reconfiguring the device;

enabling or disabling a service or component; or
applying a workaround.

6. The method of claim 1, wherein accessing the operational vulnerability announcement from the vendor comprises one of:
scraping a website of the vendor to access the operational vulnerability announcement;
using an application programming interface to access the operational vulnerability announcement;
accessing the operational vulnerability announcement from an email inbox;
receiving information relating to the operational vulnerability announcement from a software agent;
receiving information relating to the operational vulnerability announcement from a log on an impacted device; or
receiving information relating to the operational vulnerability announcement from a release note from the vendor.

7. A method for remediating operational vulnerabilities, comprising:
identifying devices in a computing environment of a first customer;
generating a configuration item (CI) for each identified device;
storing the CIs in a configuration management database (CMDB), wherein each CI is associated with the first customer;
extracting, from operational vulnerability information obtained as an electronic communication from a vendor, a structured operational vulnerability announcement that comprises a value generated from the operational vulnerability information corresponding to a field of the structured operational vulnerability announcement;
evaluating, based on the extracted value of the structured operational vulnerability announcement, CIs in the CMDB to automatically identify at least one device of the computing environment affected by the operational vulnerability; and
in response to identifying the device affected by the operational vulnerability, performing a remediation action to address the operational vulnerability, the remediation action comprising at least one of:
generating a problem record;
generating an incident record;
generating a knowledgebase article;
generating an event;
generating a task;
generating an alert;
generating a work item;
upgrading software on the device;
downgrading software on the device; or
reconfiguring the device.

8. The method of claim 1, wherein automatically performing the remediation action comprises providing an indication to management software executing on the device, thereby causing the management software to perform the remediation action at the device.

9. The method of claim 7, wherein evaluating the stored CIs comprises evaluating at least one of a manufacturer, a model, a software version, or a date of production for each CI of the stored CIs.

10. The method of claim 7, wherein the at least one remediation action is performed further based on determining not to disregard the operational vulnerability announcement based on a policy of the first customer.

11. The method of claim 10, further comprising:
automatically evaluating CIs of a second customer based on the structured operational vulnerability announcement to determine that a device of the second customer is affected by the operational vulnerability;
evaluating the structured operational vulnerability announcement based on a policy of the second customer to determine whether to disregard the operational vulnerability announcement; and
disregarding the operational vulnerability announcement for the second customer.

12. The method of claim 7, wherein generating the structured operational vulnerability announcement comprises generating a risk score for the operational vulnerability announcement.

13. The method of claim 12, wherein the risk score for the operational vulnerability announcement is adapted for the first customer.

14. A system comprising:
at least one processor; and
memory, operatively connected to the at least one processor and storing instructions that, when executed by the at least one processor, cause the system to perform a set of operations, the set of operations comprising:
accessing an operational vulnerability announcement from a vendor;
processing the operational vulnerability announcement to generate a structured operational vulnerability announcement;
storing the structured operational vulnerability announcement in a structured operational vulnerability database;
evaluating a set of devices associated with a computing device of a customer to determine that the structured operational vulnerability announcement relates to a device of the customer; and
based on determining that the structured operational vulnerability announcement relates to the device, performing a remediation action based on the structured operational vulnerability announcement, wherein the remediation action comprises automatically upgrading or automatically downgrading software on the device.

15. The system of claim 14, wherein evaluating the set of devices associated with the computing environment of the customer comprises:
accessing a set of configuration items for the customer from a configuration management database, wherein each configuration item is associated with a device of the set of devices; and
comparing each configuration item to the structured operational vulnerability announcement to determine whether the operational vulnerability announcement is applicable to the device represented by that configuration item.

16. The system of claim 14, wherein processing the operational vulnerability announcement comprises at least one of:
processing said operational vulnerability announcement with a machine learning engine; or
applying at least one normalizing policy or parsing rule to the operational vulnerability announcement.

17. The system of claim 14, wherein processing the operational vulnerability announcement further comprises:
generating a risk score for the operational vulnerability announcement; and associating the generated risk score with the structured operational vulnerability announcement.

18. The system of claim 17, wherein the set of operations further comprises evaluating the risk score based on a policy of the customer to determine whether to disregard the operational vulnerability announcement, and wherein the remediation action is performed based at least in part on determining not to disregard the operational vulnerability announcement.

19. The system of claim 14, wherein performing the remediation action further comprises at least one of:
generating a problem record;
generating an incident record;
generating a knowledgebase article;
generating an event;
generating a task;
generating an alert;
generating a work item;
enabling or disabling a service or component;
making a configuration change; or
applying a workaround.

20. The system of claim 14, wherein accessing the operational vulnerability announcement from the vendor comprises one of:
scraping a website of the vendor to access the operational vulnerability announcement;
using an application programming interface to access the operational vulnerability announcement;
accessing the operational vulnerability announcement from an email inbox;
receiving information relating to the operational vulnerability announcement from a software agent;
receiving information relating to the operational vulnerability announcement from a log on an impacted device; or
receiving information relating to the operational vulnerability announcement from a release note from the vendor.

* * * * *